July 18, 1967 T. W. MOORE 3,331,967
TIME DELAY CIRCUIT EMPLOYING SCR CONTROLLED BY
TIMING-CAPACITOR HAVING PLURAL CURRENT
PATHS FOR TOTAL DISCHARGING THEREOF
Filed May 31, 1963

INVENTOR
Thomas W. Moore

BY Stewart F. Moore
ATTORNEY 3,331,967

TIME DELAY CIRCUIT EMPLOYING SCR CONTROLLED BY TIMING-CAPACITOR HAVING PLURAL CURRENT PATHS FOR TOTAL DISCHARGING THEREOF

Thomas W. Moore, Dayton, Ohio, assignor to American Machine & Foundry Company, a corporation of New Jersey Filed May 31, 1963, Ser. No. 284,686
6 Claims. (Cl. 307—88.5)

This invention relates to time delay circuits, and more particularly to such circuits providing an accurate time delay interval not affected by prior use of the circuit.

Timer circuits are utilized in a large variety of installations to provide an output signal at a predetermined time subsequent to activation of the circuit. Most of these timer circuits include a timer capacitor which is charged at a selected rate, and a threshold device, such as a unijunction transistor, which subsequently discharges the capacitor and provides the output signal when a predetermined potential appears across the capacitor. The timer interval is determined by the time required to charge the capacitor up to the predetermined voltage required to trigger the threshold device.

A difficulty often encountered with circuits of this type is that the threshold device does not completely discharge the timer capacitor. Thus, since the timer interval is effectively the time required for the timer capacitor to charge up to the threshold potential, the first timer interval, which begins when the timer capacitor is completely discharged, will be longer than a subsequent timer interval which begins with the capacitor partially charged. If the rest interval between successive timer intervals remains constant, all timer intervals, other than the first, will be uniform since the timer capacitor is always at the same partially charged state at the beginning of each timer interval. Therefore, if the first timer interval can be disregarded, the problem of a varying timer interval is avoided. Where the rest interval does not remain constant, but is always substantially longer than the timer interval to thus permit substantially complete discharge of the timer capacitor, uniform timer intervals result. However, where the rest interval varies and may on some occasions be relatively short, some provision must be made to bring about substantially complete discharge of the timer capacitor during the shortest anticipated rest interval.

An object of this invention is therefore to provide a timer circuit for achieving precise time delay intervals not materially affected by prior use of the circuit.

Another object is to provide a circuit suitable for use in combination with capacitor timer circuits for bringing about substantially complete discharge of the timer capacitor subsequent to the beginning of each timer interval.

Another object is to provide a circuit for supplying a fixed reference potential to a timer capacitor for the duration of the timer interval, and for supply substantially zero potential subsequent to the timer interval so as to permit substantially complete discharge of the timer capacitor.

Still another object is to provide a solid state time delay circuit providing accurate timer intervals and which requires no mechanical switching components such as electromagnetic relays.

The time delay circuit in accordance with this invention utilizes a capacitor in combination with a threshold semiconductor, such as a unijunction transistor, to provide an output signal at a predetermined time after the circuit has been actuated, this output signal in turn being used to render a switching device, such as a silicon controlled rectifier, conductive. The fixed reference potential utilized for charging the capacitor during the timer interval is provided by a circuit including a resistor, an ordinary diode, and a Zener diode connected in series across the controlled rectifier. The substantial potential existing across the controlled rectifier, when nonconductive, causes current to flow in this series path and therefore, due to the characteristics of the Zener diode, a fixed potential appears across the series diodes. Once the controlled rectifier is rendered conductive, the potential drop across the controlled rectifier is reduced to a nominal value, and therefore, current can no longer flow through the series diode circuit. The diodes are so connected that under these circumstances current flows through the diodes in parallel paths providing equal and opposite potential drops across the diodes. Both diodes conduct in the forward direction and therefore the sum of potentials across the diodes is zero. Accordingly, a fixed reference potential is applied to the timer circuit so long as the controlled rectifier is nonconductive, and zero potential is applied to the timer circuit to permit complete discharge of the timer capacitor when the controlled rectifier is rendered conductive.

The timer capacitor is discharged in three stages. This capacitor is first discharged through the unijunction transistor to a level of approximately two volts at which level the unijunction transistor regains its nonconductive state. The capacitor is next discharged through a semiconductor diode down to a value corresponding to the forward conducting threshold potential of the diode, this level being approximately 0.4 volts. The capacitor is thereafter discharged exponentially through the resistors in the capacitor charging circuit.

The manner in which the stated objects, and other objects, are achieved, can better be understood by referring to the following specification and drawings, the drawings forming a portion of the specification, and wherein.

Figure 1:
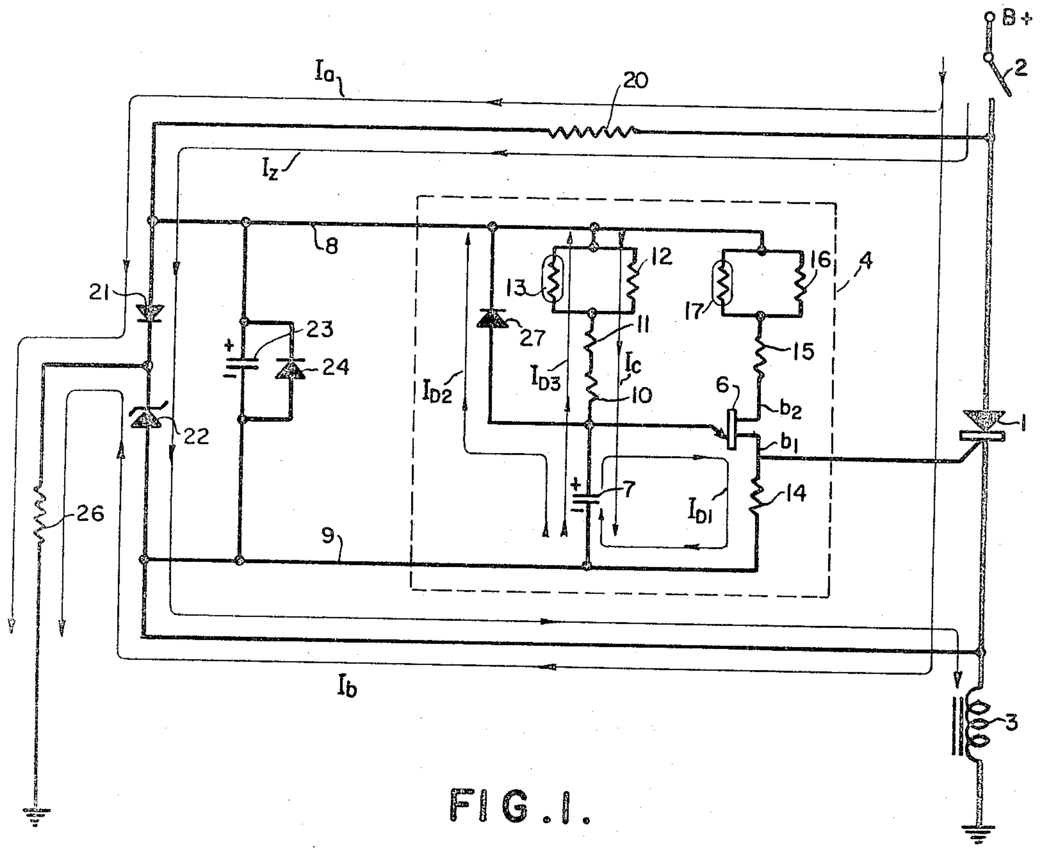
FIG. 1 is a schematic diagram illustrating one embodiment of the invention.

The time delay circuit in accordance with this invention includes a silicon controlled rectifier 1 having its anode connected to a positive source of potential through a switch 2, and having its cathode connected to ground via an inductive load 3. The purpose of the time delay circuit is to render the controlled rectifier conductive to energize the load device a predetermined time interval after switch 2 has been closed. The timer capacitor is discharged while the controlled rectifier is conductive, and if the controlled rectifier is maintained in the conductive state for a period of time approximately equal to the previous timer interval, the timer capacitor becomes completely discharged and the time delay circuit is ready for a subsequent cycle of operation. The particular time delay circuit illustrated has been designed with miniaturized components so that the circuit can be enclosed within the housing of a miniature relay. Also, the circuit is designed to operate with a very high degree of accuracy over an extremely wide range of temperatures. The timer circuit can be simplified considerably where stringent specifications as to size, accuracy and temperature ranges do not exist.

Silicon controlled rectifier 1 can be of any commercially available type capable of controlling current flow through the associated load device. A controlled rectifier is a four-layer PNPN type semiconductor which is normally nonconductive and therefore blocks current flow in either direction. However, when a positive potential is applied to the gate element, the controlled rectifier becomes conductive in the forward direction, that is, current may flow from the anode to the cathode. The controlled rectifier is thereafter maintained in the conductive state by internal regeneration but can be returned to the normal nonconductive state by decreasing current flow below a nominal holding level for the diode.

A timer circuit 4 which selectively energizes the gate of the controlled rectifier includes a timer capacitor 7 and a unijunction transistor 6 interconnected between a positive conductor 8 and a negative conductor 9. The unijunction transistor is a three element semiconductor device having an emitter and two bases referred to as base-one ($b_1$) and base-two ($b_2$). Current flow through the interbase circuit determines the threshold, or peak point, potential of the unijunction transistor. If the potential applied between the emitter and base-one exceeds this peak point potential, the transistor is triggered into a conductive state and provides a relatively low impedance between the emitter and base-one. When the emitter voltage falls below approximately two volts, the emitter ceases to conduct and the unijunction transistor returns to the nonconductive state.

Timer capacitor 7 is preferably of the tantalum type which has a capacitance to size ratio highly desirable in circuit miniaturization. The negative plate of capacitor 7 is connected to conductor 9, and the positive plate is connected to positive conductor 8 via resistors 10–13 which determine the charging time constant for the capacitor. Resistor 13 has a negative temperature coefficient to compensate for the increases in leakage resistance of timer capacitor 7 at high temperatures. Resistor 12 is connected in parallel with resistor 13 to temper the negative temperature characteristics as required for the associated timer capacitor. The bulk of the resistance in the capacitor charging circuit is provided by resistor 11 connected in series with parallel resistors 12 and 13, and in series with a smaller resistor 10. Miniature resistors are available with precision tolerances suitable for this application, but as it would be necessary to stock a large variety to cover all the possible combinations of matching parameters, it is desirable to simply select a large resistor 11 of approximately the desired value, and then select a relatively small series resistor 10 so as to obtain the desired over-all resistance.

Base-one ($b_1$) of unijunction transistor 6 is connected to the gate element of controlled rectifier 1 and to negative conductor 9 via a resistor 14. Base-two ($b_2$) is connected to positive conductor 8 via a resistor 15 connected in series with the parallel combination of resistors 16 and 17. Resistor 17 has a negative temperature coefficient and is selected to compensate for the nonlinear reduction of capacitance in timer capacitor 7 at very low temperatures, and also to compensate for variations in the diode voltage drop within the unijunction transistor caused by temperature variations. Parallel resistor 16 tempers the effect of negative temperature coefficient resistor 17 as required. The total resistance provided by resistors 14–17 is selected so that a desired quantity of interbase current flows to thus establish a desired emitter peak point voltage for the unijunction transistor. Resistor 14 is selected to provide sufficient potential to render controlled rectifier conductive when the timer capacitor discharges through the unijunction transistor. Resistor 14, however, must be sufficiently small so that the interbase current cannot develop the required triggering potential for the controlled rectifier.

When a positive potential is applied to conductor 8 with respect to conductor 9, a charging current $I_C$ flows through resistors 10–13 and therefore timer capacitor 7 charges at a rate determined by the RC time constant of the circuit. When the potential across capacitor 7 exceeds the peak point potential of the unijunction transistor, the unijunction transistor becomes conductive. Under these circumstances, timer capacitor 7 is discharged by current flow through resistor 14 which in turn develops a sufficient potential across the resistor to render silicon controlled rectifier 1 conductive.

The rate at which timer capacitor 7 charges varies in accordance with the potential applied between conductors 8 and 9, and therefore it is necessary to accurately control the applied potential during the timer interval, i.e., the interval during which capacitor 7 charges. The required reference potential is provided by a circuit including a resistor 20, a semiconductor diode 21, and a Zener diode 22 connected in series between the anode and cathode of controlled rectifier 1. The cathode of diode 21 is connected to the cathode of Zener diode 22. The characteristics of a Zener diode are such that a fixed potential, referred to as the Zener potential, appears across the diode when curent flow through the diode is in the reverse direction, i.e., from the cathode to the anode. In the forward direction, diodes 21 and 22 have approximately the same conduction characteristics and each develop approximately a 0.4 volt drop.

When controlled rectifier 1 is in the nonconductive state, it provides an anode-cathode impedance which is substantially higher than that of load inductor 3. Accordingly, a substantial potential drop appears across the controlled rectifier, and therefore a current $I_Z$ flows through resistor 20, diode 21 in the forward direction, and Zener diode 22 in the reverse direction. Under these circumstances, the potential appearing between conductors 8 and 9 is equal to the Zener potential of Zener diode 22 plus the 0.4 forward threshold conducting potential of diode 21, and remains at this value regardless of the potential appearing across the nonconducting controlled rectifier. A tantalum capacitor 23 is connected across diodes 21 and 22 to absorb any momentary decreases of supply potential below the Zener potential. The positive plate of the capacitor is connected to conductor 8 and the negative plate is connected to conductor 9. A semiconductor diode 24 is connected in parallel with capacitor 23 to protect the tantalum capacitor in the event that improper line polarity is applied to the timer circuit.

Controlled rectifier 1 is rendered conductive at the completion of a timer interval and, when conductive, provides relatively little resistance to current flow. The anode-cathode potential drop of the controlled rectifier is on the order of one volt, and therefore the cathode of controlled rectifier 1 and the positive terminal of Zener diode 22 are within approximately one volt of the positive potential B+. Under these circumstances, diode 21 and Zener diode 22 are effectively connected in parallel with one another and are both conductive in the forward direction. This is accomplished by means of a resistor 26 connected between ground and the common cathode connection between the diodes. More specifically, a current $I_a$ flows from the positive source of potential B+ through resistor 20, diode 21 in the forward direction and to ground through resistor 26. A current $I_b$ flows from the positive source of potential B+ through controlled rectifier 1, Zener diode 22 in the forward direction, and to ground also through resistor 26. The potential drop appearing across diode 21 is equal and opposite to that appearing across Zener diode 22 while the voltage drop across controlled rectifier 1 is compensated for by resistance 20 to provide balanced parallel paths for currents $I_a$ and $I_b$, and therefore no substantial potential can exist between conductors 8 and 9.

Timer capacitor 7 is discharged in three stages subsequent to each timer interval. When unijunction transistor 6 is rendered conductive, capacitor 7 is first discharged to a level of approximately 2 volts (this being the level at which the unijunction transistor regains its nonconductive state) by a current $I_{D1}$ which flows from the positive plate of the capacitor through the emitter base-one circuit of the unijunction transistor and through resistor 14 to the negative plate of the capacitor. Capacitor 7 is next discharged through a diode 27 connected between the positive plate of capacitor 7 and conductor 8. Diode 27 provides a low impedance path for a current $I_{D2}$ through the capacitor and the diode, which discharges the capacitor to a level of approximately 0.4 volt (0.4 volt being the forward conducting threshold voltage of diode 27). Thereafter, capacitor 7 continues to discharge exponentially toward zero potential thereacross by means of a current $I_{D3}$ flowing through resistors 10–13. It has been found that capacitor 7 can be discharged sufficiently to achieve a timer interval accuracy of ±3% during a rest interval approximately equal to the time delay interval of the circuit.

Figure 2:
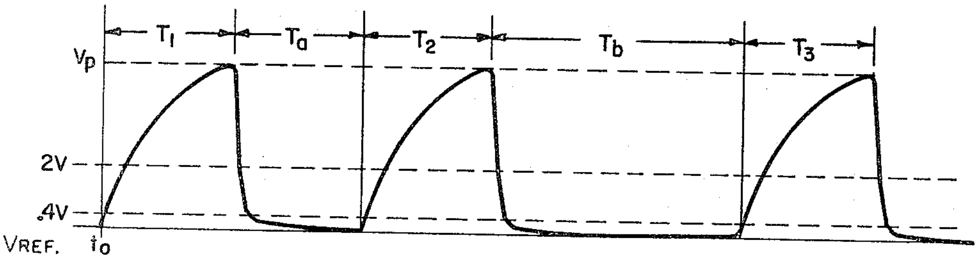
FIG. 2 represents the wave shape of the signal appearing across the timer capacitor of the circuit illustrated in FIG. 1.

The potential appearing across timer capacitor 7, which is the same as that appearing at the emitter of the unijunction transistor 6, is illustrated by the wave forms in FIG. 2. If switch 2 is closed at time $t_0$ current flows through diode 21 in series with Zener diode 22 to thus provide a fixed reference potential between conductors 8 and 9 since controlled rectifier 1 is initially nonconductive. Accordingly, capacitor 7 begins to charge exponentially. The potential across timer capacitor 7 reaches the peak point potential $V_p$ after a timer interval $T_1$. Unijunction transistor 6 then becomes conductive, in turn applying a positive potential to the gate of controlled rectifier 1 to render the controlled rectifier conductive and permit current flow through load 3. As soon as controlled rectifier 1 becomes conductive, diode 21 is effectively connected in parallel with Zener diode 22 and both diodes are conductive in the forward direction. The potential between conductors 8 and 9, each at a reference voltage $V_{ref}$ determined by the voltage drop across resistance 26 and the conduction resistance of diode 21 and Zener diode 22, becomes substantially zero and therefore timer capacitor 7 can be discharged. As is seen in FIG. 2, the timer capacitor is first very rapidly discharged through the unijunction transistor to a level of approximately two volts. The capacitor is then rapidly discharged through diode 27 to a level of approximately 0.4 volt. Finally, the capacitor is exponentially discharged toward zero through resistors 10–13. After a rest interval $T_a$, the charge across the timer capacitor has decreased sufficiently so that no substantial error results from initiating a new timer cycle.

At the completion of the rest interval $T_a$, switch 2 can be opened momentarily to render controlled rectifier 1 nonconductive, and therefore when the switch is subsequently closed, the timer cycle will repeat itself. Thus, capacitor 7 charges at the same rate from a substantially zero potential and after a time interval $T_2$, which is identical to the timer interval $T_1$, controlled rectifier 1 becomes conductive and load 3 is energized. The next rest period $T_b$ may be substantially greater than the rest interval $T_a$, but since the potential across the timer capacitor returns to substantially zero, the third timer interval $T_3$ will be substantially identical to the other timer intervals. Thus, it is seen that the timer interval remains substantially constant regardless of prior use if the rest interval is at least equal to the timer interval.

While only one illustrative embodiment of the invention has been illustrated in detail, it should be obvious that numerous changes could be made without departing from the spirit and scope of this invention. The invention is more particularly defined in the appended claims.

What is claimed is:

1. In a time delay circuit of the type including a timer circuit for controlling a semiconductor switching device, the combination of
   - a semiconductor diode;
   - a Zener diode;
   - first circuit means connecting said diodes in series for conduction through said Zener diode in the reverse direction across said switching device to provide a fixed potential to said timer circuit when said switching device is nonconductive; and
   - second circuit means for connecting said diodes in parallel with one another for conduction through said Zener diode in the forward direction so that no substantial potential is supplied to said timer circuit when said switching device is conductive.

2. In a time delay circuit of the type including a timer circuit for controlling the conductive state of a semiconductor switching device connected in series with a load device, the combination of
   - a first resistor,
   - a semiconductor diode,
   - a Zener diode,
   - circuit means for interconnecting said components in series so that, when said switching device is nonconductive, current flows through said resistor, said semiconductor diode in the forward direction and said Zener diode in the reverse direction, to provide a fixed reference potential across said diodes;
   - a second resistor, and
   - circuit means for connecting said diodes in parallel when said switching device is conductive so that current flows in one path through said first resistor, said semiconductor diode, and said second resistor, and in a parallel path through said Zener diode in the forward direction and said second resistor, thereby providing approximately equal and opposite potential drops across the diodes.

3. In a capacitor timer circuit including a threshold semiconductor device, and being of the type wherein a fixed reference potential is supplied when the timer circuit is actuated and for the duration of the timer interval and wherein no potential is applied subsequent to said timer interval, the combination of
   - means for bringing about substantially complete discharge of said timer capacitor subsequent to said timer interval;
   - said means comprising
     - a first discharge circuit for discharging said capacitor through said threshold semiconductor device so long as it remains conductive,
     - a second discharge circuit including a semiconductor diode for further discharging said capacitor when no substantial potential is applied to the timer circuit, and
     - a third discharge circuit to thereafter complete the discharge of said capacitor exponentially through a resistor so long as no potential is applied to the timer circuit.

4. In a time delay circuit, the combination of
   - a semiconductor switching device for controlling current flow through a load device;
   - a timer circuit for controlling the conductive state of said switching device; and
   - circuit means for providing a substantially fixed potential to said timer circuit when said switching device is nonconductive and no substantial potential when said switching device is conductive;
   - said timer circuit comprising
     - a threshold semiconductor device connected to said switching device,
     - a capacitor so connected to said threshold semiconductor device that both of said semiconductors become conductive to thereby eliminate the potential supplied to said timer circuit via said circuit means when a predetermined potential appears across said capacitor,
     - charging circuit means for charging said capacitor when said fixed potential is applied to said timer circuit,
     - discharging circuit means for bringing about a substantially complete discharge of said capacitor when said switching device is conductive, including
       - a first discharge circuit for partially discharging said capacitor through said threshold semiconductor when conductive, a second discharge circuit for further discharging said capacitor through a semiconductor diode when the potential supplied to said timer circuit is eliminated, and a third discharge circuit for exponentially completing the discharge of said capacitor via a resistor in said charging circuit.

5. A time delay circuit in accordance with claim 4 wherein said semiconductor switching device is a controlled rectifier, and said threshold semiconductor device is a unijunction transistor.

6. A time delay circuit in accordance with claim 4 wherein said circuit means comprises a semiconductor diode, a Zener diode, circuit means for connecting said diodes in series across said switching device to provide said fixed potential when said switching device is nonconductive, and circuit means for connecting said diodes in parallel so that no substantial potential is supplied to said timer circuit when said switching device is conductive.

References Cited

UNITED STATES PATENTS 3,244,965 4/1966 Gutzwiller -------- 307—88.5 X

ARTHUR GAUSS, *Primary Examiner.*

J. S. HEYMAN, *Assistant Examiner.*